Jan. 10, 1956  H. A. QUIST  2,730,123
TANK FLOAT
Filed March 17, 1953  2 Sheets—Sheet 1
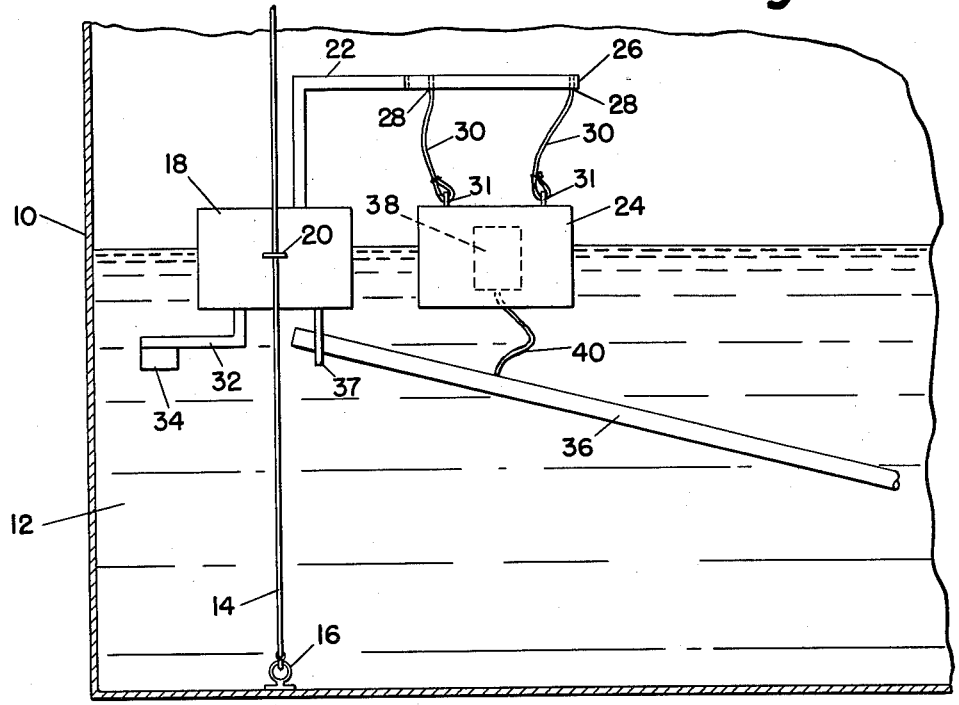
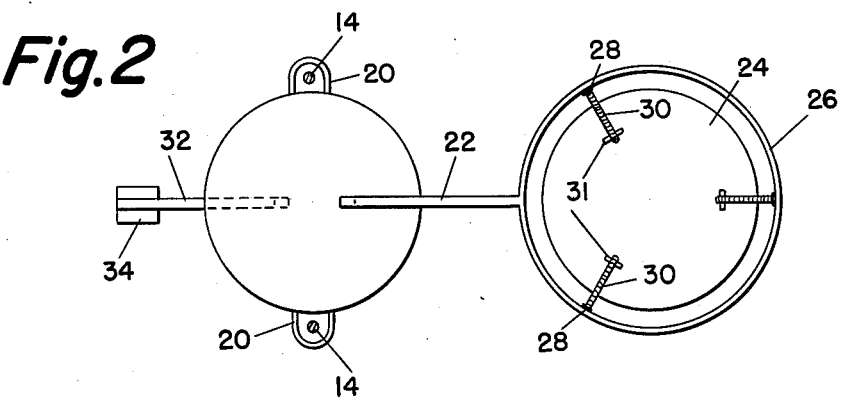
INVENTOR.
HAROLD A. QUIST
BY Robert O. Spindle
ATTORNEY

United States Patent Office 2,730,123
Patented Jan. 10, 1956

2,730,123

TANK FLOAT

Harold A. Quist, Swarthmore, Pa., assignor to Sun Oil Company, Philadelphia, Pa., a corporation of New Jersey Application March 17, 1953, Serial No. 342,864

2 Claims. (Cl. 137—452)

This invention relates to gauge apparatus for indicating liquid levels in general and more particularly to the float structure used in such apparatus.

The simplest devices used for measuring or indicating liquid levels employ a float to follow the rise and fall of the liquid surface. In order to give an indication of value, it is necessary to guide the float substantially in line with the elements used to transfer the float elevation to the indicating elements. Single or multiple guides such as rods or cables are common and form a path restricting the float movement within the required limitations. Due to freezing of the collected condensate, gumming or cocking of the float because of turbulence in the liquid body, the float is frequently, even if only temporarily, caused to give a false indication. It is an object of this invention to provide an improved form of gauging float system which will give correct indications of liquid levels under all conditions and at all times.

Various modifications of structure in the float have been suggested to prevent binding on the guide rods or cables. These have taken the form of wheel engagers mounted on the float, shaped holes to minimize the contact surface with the guides and other means limiting free suspension which resulted in faulty depth indications. It is a further object of this invention to provide a guided float system, oriented to give accurate indications of liquid levels yet remain operationally free of the effect of the guide elements.

The invention consists in a tandem float arrangement comprising a guide float and an indicating float. Both floats are flexibly coupled to operate together, yet are independent of each other regarding the liquid surface sensing function. Further, the float system is balanced to preserve the guided-independent operation free of gravitational and mechanical obstructing influences.

The above stated objects and others as may appear from the following specification will be best understood from a description of the accompanying drawing which illustrates one embodiment thereof and in which:

Figure 1 is an elevational view showing one use of the device.

Figure 2 is a partial plan view of Figure 1 taken along lines 2—2.

Figure 3:
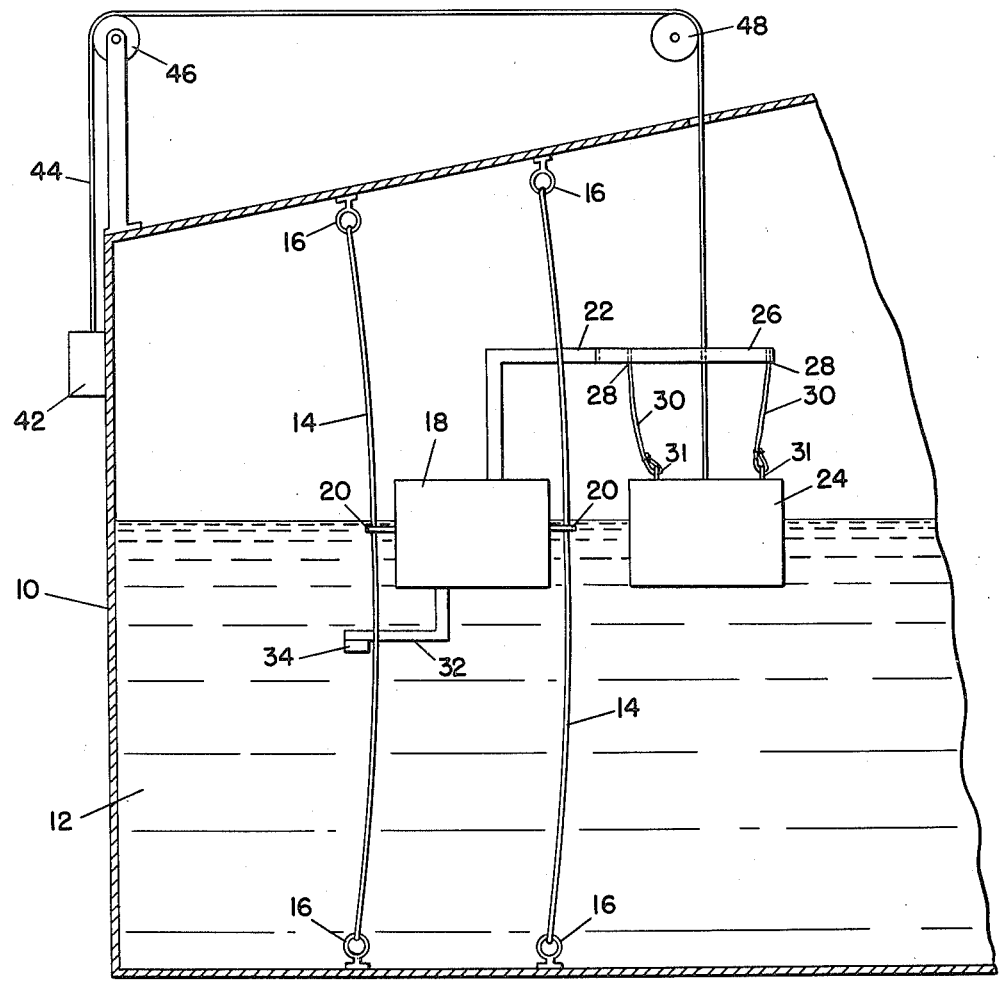
Figure 3 is a further elevational view showing a further application of the float system.

In Figures 1 and 3 of the drawing, two common applications of float structures used in cooperation with liquid depth indicators are illustrated. In one instance the presently described float system is applied to support a secondary indicating mechanism such as is used in application Serial No. 327,726, filed December 24, 1952, and entitled "Liquid Level and Temperature Indicator." The second application of the device as illustrated shows a typical overhead operated liquid depth indicating mechanism combined with this float system.

Referring now to the first application as shown in Figure 1, a storage tank 10 is illustrated as supporting a body of liquid 12, the surface of which is to be indicated.

Within the tank 10 a pair of guide cables 14 are anchored at the top and bottom of the tank in a manner illustrated at 16. The guide float 18, indicated as cylindrical in the two views of Figures 1 and 2, engages the guides 14 as by the wide loops 20 fastened to the float body, or any other comparatively free sliding means.

A bracket 22 extends upwardly and to one side of the guide float 18 in such a manner as to clear the second or indicating float 24 shown beside float 18, but the bracket is shaped, sized or so extended not to obstruct or interfere in the free float operation. Here the bracket 22 is shown formed into a ring 26 over the operating area of the indicating float 24 as a preferred structure. The purpose is to supply three equally spaced anchor points 28 to which the float 24 is attached as by the short, flexible cables 30 cooperating with connectors 31. Such connection can be made with a delta or Y figure, it will be recognized, to serve the same purpose.

To preserve a balance for the guide float 18 and reduce the tendency to bind on the guides 14 to a minimum, a counterbalance bracket 32 and weight 34 are arranged to cooperate with the guide elements. The buoyant effect of the liquid 12 in which the counterbalancing means is immersed is taken into consideration when determining the operation of the bracket 22.

Figures 1 and 2 are completed by describing the auxiliary equipment which is suggested here as suspended from the indicating float 24. Reference to the application noted above will show a tube 36 capable of being supported on one end in the body of liquid by attachment 37 to the guide float 18. A pressuring and/or temperature responsive means of liquid type is shown as stored in a container 38 supported in the indicating float 24 and connected through tube 36 by a connecting conduit 40 to a measuring source after exposure to the temperature of the liquid surrounding the tube 36. Thus the supporting structure shown as tube 36 with its component parts and responsive liquid are carried by the guide float 18 while the surface sensitive indicating float 24 carries only the responsive liquid.

A further modification of the device is shown in Figure 3 where it is adapted for use with a level indicator such as a weight arranged to slide against an elevation indicator marked on the side of a storage tank. In this illustration the guide float 18 and the indicating float 24, together with the cooperating elements, are arranged and constructed as already described. The guide cables 14 anchored within the storage tank 10 as at 16 are shown in this instance, as deflected from vertical position. This is a common occurrence and arises because of pumping in and out operations and extreme temperature variations. By coupling the floats 18 and 24 together with the bracket 22 and cables 30, the effect of the deflection and the consequent friction drag on the guide means is not transmitted to the indicating elements. In any case these conditions can affect the guide float only while the indicating float remains free to give the correct surface elevation.

As was noted in describing Figure 1, the weight 34 and balancing bracket 32 negative the turning tendency caused by bracket 22. The indicating float 24 is adjusted to float in the liquid 12 at the proper depth to transfer the surface elevation data to the weighted marker 42 through the flexible cable 44 passing over pulleys 46 and 48.

The description of the separate uses of the float system shows the purpose and cooperation of the elements of the combination to be the same in the two considered uses. In both instances the float system is considered as including a guide means and an indicating means. A description of the operation of the combination will be given in broad terms referring only incidentally to the illustrated specific arrangements of the elements in Figures 1 and 3 if required to illustrate a particular advantage.

A body of liquid 12 acts buoyantly on both the guide float and the indicating float as determined in the original design of these elements. By considering the specific gravity of the liquid, the shape and dimensions of the floats, and the weight and position of the float supported elements, a wide variation in design is possible. It may be desirable to keep the floats abreast as they rise and fall with the liquid level, or to have one anticipate the other for some specific purpose such as sounding an alarm through electrical contact. Variations in these respects are readily recognized as within the capabilities of anyone conversant with the art and are not detailed here.

Considering it to be desirable for a specific purpose to keep the floats abreast as illustrated, the weights and brackets are adjusted to cooperate as part of the guide means on float 18. The loops 20 are fashioned sufficiently large to slide over the guides 14 without binding for all normal conditions of operation. Where it is necessary to support additional elements, the float 18 is designed to accept the added burden and remain at the desired depth of immersion.

The indicating means of the combination includes a float 24 designed for cooperation with the guide means. The buoyancy of this float element is maintained sufficiently by proper design to support additional weights such as the container 38 and the liquid therein as illustrated in Figure 1, or is made of proper stability to hold the marker 42 in suspension and remain at the proper sensing depth as is shown in Figure 3. In either case, the requisite is for a float element sufficiently stable to fulfill the requirements of the connected indicating elements, yet responsive to the slightest change in liquid elevation.

As the liquid volume changes in depth the guide means maintains an alignment of the guiding float as close to vertical movement as is consistent with reasonable indicating accuracy. By means of the bracket and cable arrangement, the indicating means is aligned and permitted immediate and accurate response which the guide float alone cannot give because of the frictional limitations of the guides required to contact it. The result is an accurate surface reading of the stored liquid by a comparatively free operating float properly aligned with the indicating elements.

The tandem float arrangement described utilizes a desirable form of apparatus for indicating liquid levels, and improves an otherwise accepted device by removing the objections of lag, lack of response and sticking. In considering the disclosed device as two separate groups of elements, designated as guide and indicating means, a variety of changes without limit are suggested. Basically, however, the principal elements are the guide and indicating floats. It is intended that the means to control these elements, in relation to both the container in which they operate and between themselves, are only conventionally indicated and may take many forms. The scope of the invention as here disclosed is intended to be limited only by the claims included herein.

The invention claimed is:

1. A float system for use in sensing liquid levels in storage tanks comprising, in combination with a liquid level measuring element, a pair of spaced apart floats, namely, a guided float and an indicating float, means connecting the latter float with the measuring element; substantially vertically extending guides engaging the guided float and allowing it to move up and down with changes in vertical liquid level while limiting its horizontal movement, and means connecting the two floats including a flexible connection permitting movement of the indicating float, both vertically and horizontally, independent of the guided float.

2. The float system defined in claim 1 in which the connecting means between the two floats includes a bracket carried by the guided float, the said flexible connection connecting the bracket and the indicating float, and a weighted member, also carried by the guided float, balancing the weight of the bracket.

References Cited in the file of this patent

UNITED STATES PATENTS

| 579,513 | Brownlee | Mar. 23, 1897 |
| 1,294,265 | Hirsch | Feb. 11, 1919 |
| 1,788,465 | Lamar | Jan. 13, 1931 |
| 1,969,186 | Russ | Aug. 7, 1934 |
| 2,054,212 | Bacon | Sept. 15, 1936 |
| 2,110,490 | Renner | Mar. 8, 1938 |